(12) United States Patent
Miao et al.

(10) Patent No.: US 11,367,248 B2
(45) Date of Patent: Jun. 21, 2022

(54) FORMATION RESISTIVITY EVALUATION SYSTEM

(71) Applicant: Halliburton Energy Services, Inc., Houston, TX (US)

(72) Inventors: Yang Miao, Cypress, TX (US); William David Bethancourt, Houston, TX (US); Jeremy James Combs, Spring, TX (US); Juan Carlos Fernandez, Spring, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 16/769,777

(22) PCT Filed: Mar. 6, 2018

(86) PCT No.: PCT/US2018/021169
§ 371 (c)(1),
(2) Date: Jun. 4, 2020

(87) PCT Pub. No.: WO2019/172892
PCT Pub. Date: Sep. 12, 2019

(65) Prior Publication Data
US 2020/0302678 A1 Sep. 24, 2020

(51) Int. Cl.
*G06T 15/08* (2011.01)
*E21B 49/00* (2006.01)
(Continued)

(52) U.S. Cl.
CPC .............. *G06T 15/08* (2013.01); *E21B 49/00* (2013.01); *G01V 3/20* (2013.01); *G01V 3/38* (2013.01)

(58) Field of Classification Search
CPC ......... G06T 15/08; E21B 49/00; E21B 47/00; G01V 3/20; G01V 3/38; G01V 3/26
See application file for complete search history.

(56) References Cited

U.S. PATENT DOCUMENTS

| 7,062,072 B2 | 6/2006 | Anxionnaz et al. |
| 2002/0040274 A1* | 4/2002 | Yin ........................ G01V 1/40 702/7 |

(Continued)

FOREIGN PATENT DOCUMENTS

EP 2758810 B1 3/2016

OTHER PUBLICATIONS

International Search Report and Written Opinion dated Dec. 4, 2018, International PCT Application No. PCT/US2018/021169.

*Primary Examiner* — Tarun Sinha
*Assistant Examiner* — Lal C Mang
(74) *Attorney, Agent, or Firm* — McGuireWoods LLP

(57) ABSTRACT

The disclosed embodiments include systems and methods to evaluate formation resistivity. The method includes obtaining, from a downhole tool deployed in a borehole, a plurality of values of formation resistivity of a downhole formation proximate the borehole. The method also includes generating a plurality of two-dimensional renderings of the formation resistivity based on the plurality of values, wherein each two-dimensional rendering of the plurality of two-dimensional renderings illustrates an inversion of the formation resistivity along a plane of the downhole formation. The method further includes generating a volumetric rendering of the formation resistivity of the downhole formation from the plurality of two-dimensional renderings, wherein the volumetric rendering comprises a plurality of two-dimensional planes, and wherein each two-dimensional plane of the plurality of two-dimensional planes illustrates an inversion of formation resistivity along the respective plane. The method further includes providing the volumetric rendering for display on an electronic device.

20 Claims, 7 Drawing Sheets

(51) Int. Cl.
G01V 3/20 (2006.01)
G01V 3/38 (2006.01)

(56) References Cited

U.S. PATENT DOCUMENTS

| | | | |
|---|---|---|---|
| 2003/0223620 A1* | 12/2003 | Anxionnaz | G06K 9/00 |
| | | | 382/109 |
| 2011/0144913 A1 | 6/2011 | Klein et al. | |
| 2011/0175899 A1 | 7/2011 | Bittar et al. | |
| 2016/0090822 A1* | 3/2016 | Lu | E21B 41/00 |
| 2016/0370480 A1* | 12/2016 | Shetty | G01V 1/30 |
| 2018/0340410 A1* | 11/2018 | Rivera-Rios | E21B 44/02 |

* cited by examiner

FORMATION RESISTIVITY EVALUATION SYSTEM

BACKGROUND

The present disclosure relates generally to systems and methods to evaluate formation resistivity of a formation proximate a wellbore.

Data indicative of formation resistivity are often gathered during preparation, drilling, and production stages of a hydrocarbon well. The data are analyzed to determine material properties of the formation proximate a wellbore, the location of hydrocarbon resources proximate the wellbore, the location of other fluids in the formation, the well path of the wellbore, as well as other quantitative information about the wellbore and the formation proximate the wellbore.

Models are sometimes generated based on data indicative of the formation resistivity to assist operators to quantitatively analyze the formation. However, these models are often difficult for operators to analyze and often lack sufficient quantitative information about the formation of the resistivity of the formation.

BRIEF DESCRIPTION OF THE DRAWINGS

Illustrative embodiments of the present disclosure are described in detail below with reference to the attached drawing figures, which are incorporated by reference herein, and wherein.

Figure 1A:
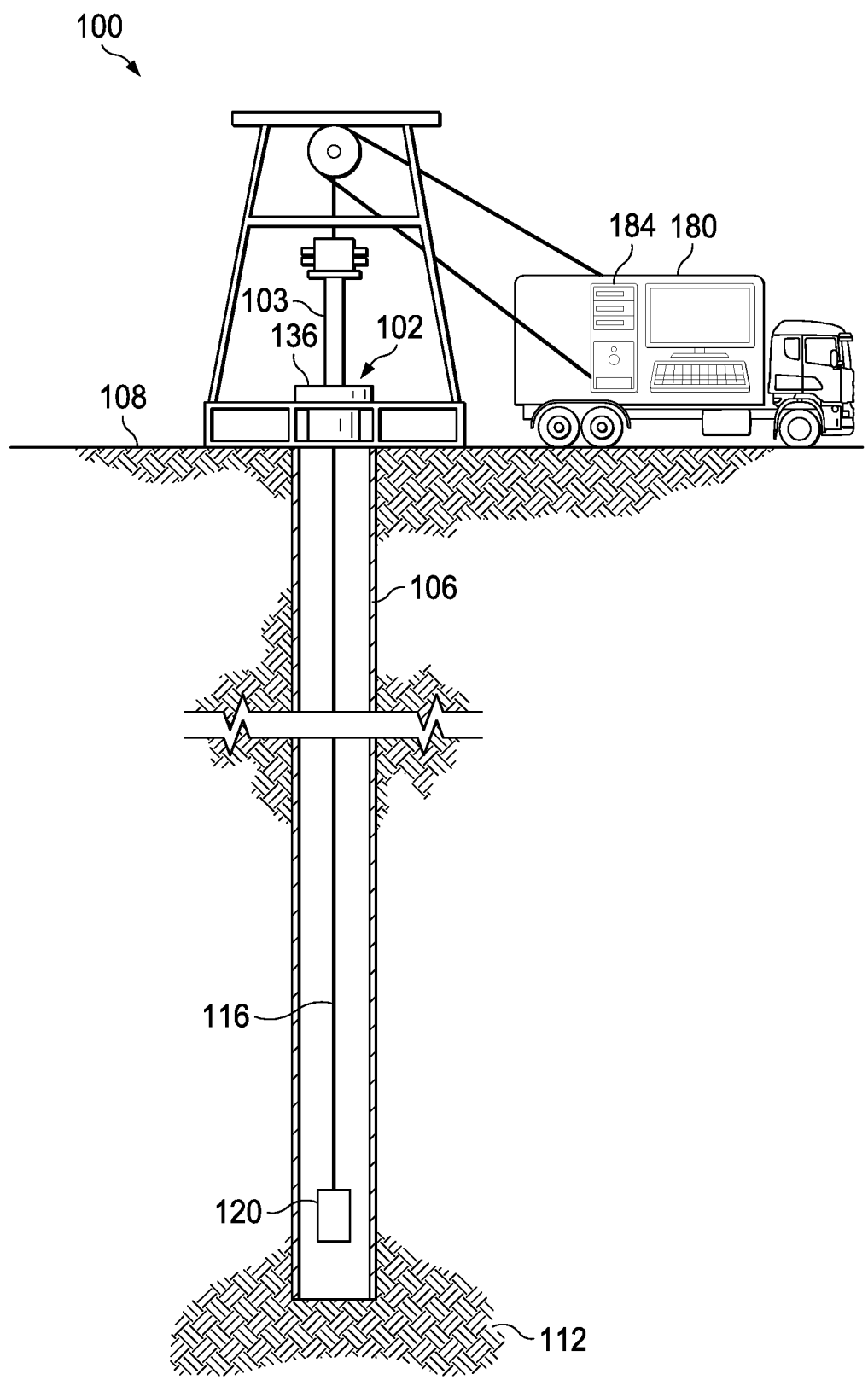
FIG. 1A is a schematic, side view of a logging environment, where measurements of the formation resistivity are obtained, and are displayed on a display.

The illustrated figures are only exemplary and are not intended to assert or imply any limitation with regard to the environment, architecture, design, or process in which different embodiments may be implemented.

DETAILED DESCRIPTION

In the following detailed description of the illustrative embodiments, reference is made to the accompanying drawings that form a part hereof. These embodiments are described in sufficient detail to enable those skilled in the art to practice the invention, and it is understood that other embodiments may be utilized and that logical structural, mechanical, electrical, and chemical changes may be made without departing from the spirit or scope of the invention. To avoid detail not necessary to enable those skilled in the art to practice the embodiments described herein, the description may omit certain information known to those skilled in the art. The following detailed description is, therefore, not to be taken in a limiting sense, and the scope of the illustrative embodiments is defined only by the appended claims.

The present disclosure relates to systems and methods to evaluate formation resistivity of a formation. More particularly, the present disclosure relates to systems and methods to generate a volumetric rendering of the formation resistivity of the formation and to display the volumetric rendering of the resistivity of the formation. A volumetric rendering of the formation resistivity may generally refer to a three-dimensional rendering of an inversion of the formation resistivity of a formation within a defined volume of space. For example, if the defined volume of space is a cubic foot of formation proximate a borehole, then the volumetric rendering is a three-dimensional rendering of the cubic foot of the formation. Moreover, the volumetric rendering of the formation resistivity includes multiple two-dimensional planes, where each two-dimensional plane illustrates an inversion of the formation resistivity along the respective plane. For example, the volumetric rendering of the cubic foot of formation includes multiple two-dimensional planes that illustrate the inversion of the formation resistivity along planes defined by an x-axis and a y-axis of the cubic foot of formation, multiple two-dimensional planes that illustrate the inversion of the formation resistivity along planes defined by the x-axis and a z-axis of the cubic foot of the formation, and multiple two-dimensional planes that illustrate the inversion of the formation resistivity along planes defined by the y-axis and the z-axis of the cubic foot of the formation. An operator may sometimes desire to view a three-dimensional representation of a volume of the formation for a variety of purposes, including to determine resistivity measurements within the volume, determine locations of nearby hydrocarbon resources, determine a location of a boundary (such as a boundary with water, a boundary with hydrocarbon resources, or a boundary of a bedrock in the formation), material properties of the formation within the volume, and to make other determinations. The system, in response to determining a request from the operator to view a volumetric rendering of the formation, obtains values of the formation resistivity of the volume of the formation. In some embodiments, the formation resistivity is the true vertical depth resistivity of the formation.

The values of the formation resistivity are utilized to generate two-dimensional renderings of formation resistivity. More particularly, the two-dimensional renderings illustrate an inversion of the formation resistivity along different planes of the volume of downhole formation. A volumetric rendering of the formation resistivity of the volume of downhole formation is then generated from the two-dimensional renderings, and is displayed on an operator's electronic device. The volumetric rendering is displayed in a range of colors. In some embodiments, the range of colors represents a range of resistivity measurements of the formation resistivity. In further embodiments, the range of colors represents a change in the formation resistivity. In further embodiments, the range of colors represents distance to a particular boundary. In further embodiments, the range of colors represents one or more forms of electromagnetic radiation. In one or more of such embodiments, the range of colors represents a range of gamma radiations emitted by the formation, or a change in the gamma radiations of the formation. In one or more of such embodiments, the range of colors represents a range of x-radiations emitted by the formation, or a change in the x-radiations of the formation. In further embodiments, the range of colors represents the density of the formation. In further embodiments, the range of colors represents the porosity of the formation. In further embodiments, the range of colors represents seismic waves emitted by the formation.

The operator may elect to view different angles of the displayed volumetric rendering. In that regard, the system, in response to detecting user inputs to rotate the volumetric rendering, is operable to provide different views of the volumetric rendering, such as displaying a perspective view of the volumetric rendering along an x-axis and a y-axis, displaying a perspective view of the volumetric rendering along the x-axis and a z-axis, and displaying a perspective view of the volumetric rendering along the y-axis and the z-axis. The operator may also elect to zoom in on or zoom out from the volumetric rendering. The system, in response to detecting user inputs to zoom in or zoom out, is also operable to zoom in or zoom out on the volumetric rendering.

Periodically, the operator may desire to analyze specific portions of the volumetric rendering. In such embodiments, the operator may enter a display parameter to customize the display of the volumetric rendering to display portions of the volumetric rendering that satisfy the display parameter. Examples of display parameters include, formation resistivity threshold, formation resistivity range, formation radiation threshold, formation radiation range, formation density threshold, formation density range, formation porosity threshold, formation porosity range, distance from the borehole, distance to a boundary (such as water, hydrocarbon resource, a bedrock), range of colors illustrating the volumetric rendering, variation in formation resistivity within a threshold distance, two-dimensional planes along an x-axis and a y-axis, two-dimensional planes along an x-axis and a z-axis, two-dimensional planes along a y-axis and a z-axis, variation of the opacity of a two-dimensional plane, variation of the opacity of certain points on a two-dimensional plane, as well as other quantifiable parameters. For example, the operator may wish to focus on portions of the volumetric rendering that illustrate a specific range of formation resistivity. In some embodiments, the system, in response to receiving inputs indicative of the display parameter to display a specific range of formation resistivity, accentuates a two-dimensional plane (or multiple two-dimensional planes) that illustrates an inversion of the specific range of the formation resistivity. A two-dimensional plane may generally be "accentuated" if the two-dimensional plane is displayed to include more prominent features relative to other two-dimensional planes that are not accentuated. In some embodiments, the system accentuates a two-dimensional plane by removing other two-dimensional planes that are not accentuated from being displayed on the electronic device. In other embodiments, the system accentuates the two-dimensional plane by reducing the display resolution of other two-dimensional planes that are not accentuated. In further embodiments, the system accentuates the two-dimensional plane by displaying other two-dimensional planes as more transparent or translucent relative to the accentuated two-dimensional plane, or by adjusting the opacity level of the other two-dimensional planes. In some embodiments, the display parameters specify a specific color or range of colors of interest. In such embodiments, the system, in response to receiving inputs indicative of the display parameters to display a specific color or range of colors of interest, accentuates two-dimensional planes, or areas of two-dimensional planes that contain the specific color or range of colors of interest. In other embodiments, the display parameters specify a specific color or range of colors that the operator would like to ignore. In such embodiments, the system, in response to receiving inputs indicative of the display parameters to display a specific color or range of colors the operator would like to ignore, removes two-dimensional planes, or areas of two-dimensional planes that contain the specific color or range of colors that the operator would like to ignore from being displayed. In further embodiments, the system, in response to receiving inputs indicative of the display parameters to display a specific color or range of colors the operator would like to ignore, renders two-dimensional planes, or areas of two-dimensional planes that contain the specific color or range of colors that the operator would like to ignore as more opaque relative to other two-dimensional planes or areas of two-dimensional planes that do not contain the specific color or range of colors the operator would like to ignore.

Although the volumetric rendering is formed from multiple two-dimensional renderings, in some embodiments, the system accentuates multiple points along different two-dimensional planes that represent different points of the formation that have essentially identical values, such as formation resistivity, formation radiation, formation density, formation porosity, or have values that are within a threshold range of the foregoing formation properties. For example, the system may accentuate all points of the volumetric rendering that represent points of the formation that have identical formation resistivity or have formation resistivity within a threshold range.

In other embodiments, the system accentuates two-dimensional planes that are not illustrated by any individual two-dimensional rendering. For example, where the two-dimensional renderings of a volume of the formation are renderings along planes defined by an x-axis and a y-axis of the volume of the formation, the accentuated two-dimensional plane may be a plane defined by the y-axis and a z-axis of the volume of the formation or a plane defined by the x-axis and the z-axis of the volume of the formation.

In some embodiments, where multiple two-dimensional planes are accentuated, the multiple two-dimensional planes are parallel relative to each other. In other embodiments, accentuated two-dimensional planes bisect each other. The operator may elect to view different angles of an accentuated two-dimensional plane. In that regard, the system, in response to detecting user inputs to rotate the accentuated two-dimensional plane, is operable to provide different views of the accentuated two-dimensional plane. The operator may also elect to zoom in or zoom out on the accentuated two-dimensional plane. The system, in response to detecting user inputs to zoom in or zoom out, is also operable to zoom in or zoom out on the accentuated two-dimensional plane. Additional descriptions of the foregoing systems and methods to evaluate formation resistivity are described in the paragraphs below and are illustrated in FIGS. 1-4.

Turning now to the figures, FIG. 1A is a schematic, side view of a logging environment 100 with a tool 120 deployed in a borehole 106 to measure properties of a formation 112 surrounding borehole 106. "Tool 120" may represent any tool (such as, but not limited to, an electromagnetic logging device, nuclear magnetic resonance device, or any other type of logging device) or component thereof operable of obtaining resistivity measurements of a downhole formation. In other embodiments, tool 120 represents an electromagnetic tool operable of measuring electromagnetic radiations (such as gamma ray radiations, x-ray radiations, as well as other types of electromagnetic radiations) emitted by formation 112 or emitted by materials deployed in borehole 106. In further embodiments, tool 120 represents other types of tools operable of measuring other formation properties (such as, but not limited to, formation density and formation porosity) of formation 112. FIG. 1A may also represent another completion or preparation environment where a logging operation is performed. In the embodiment of FIG. 1A, a well 102 having borehole 106 extends from a surface 108 of well 102 to or through a formation 112. A conveyance 116, optionally carried by a vehicle 180, is positioned proximate to well 102. Conveyance 116 along with tool 120 are lowered down borehole 106, i.e. downhole. In one or more embodiments, conveyance 116 and tool 120 are lowered downhole through a blowout preventer 103.

In one or more embodiments, conveyance 116 may be wireline, slickline, coiled tubing, drill pipe, production tubing, downhole tractor or another type of conveyance operable to deploy tool 120. Conveyance 116 provides mechanical suspension of tool 120 as tool 120 is deployed downhole. In one or more embodiments, conveyance 116 also provides power to tool 120 as well as other downhole components. In one or more embodiments, conveyance 116 also provides downhole telemetry. Additional descriptions of telemetry are provided in the paragraphs below. In one or more embodiments, conveyance 116 also provides a combination of power and downhole telemetry to tool 120. For example, where conveyance 116 is a wireline, coiled tubing (including electro-coiled-tubing), or drill pipe, power and data are transmitted along conveyance 116 to tool 120.

In some embodiments, a surface based electronic device, such as controller 184, includes a processor operable to generate two-dimensional renderings of the formation resistivity based on the plurality of values obtained from tool 120 and further operable to generate a volumetric rendering of the formation resistivity of the downhole formation from the plurality of two-dimensional renderings. Controller 184 may represent any electronic device operable to display a volumetric rendering of the formation resistivity. In such embodiments, data obtained by tool 120 are transmitted to controller 184 and are processed by the processor of the controller 184. The processor is further operable to cause controller 184 to display the volumetric rendering on controller 184 or another electronic device and to perform operations described herein to accentuate the display of certain two-dimensional planes on controller 184. In some embodiments, the processor if controller 184 is also operable to generate two-dimensional renderings of the formation resistivity based on resistivity values obtained from tool 120 and to generate a volumetric rendering of the formation resistivity of formation 112 from the plurality of two-dimensional renderings. Additional descriptions of the processor and operations performed by the processor are described in the paragraphs below. In some embodiments, tool 120 includes a processor (not shown) operable to generate two-dimensional renderings of the formation resistivity based on the values of formation 112 and to generate a volumetric rendering of the formation resistivity of formation 112 from the plurality of two-dimensional renderings. In such embodiments, tool 120 is communicatively connected to controller 184 via a telemetry system described herein and is operable to provide the generated two-dimensional renderings and three-dimensional renderings to controller 184.

Figure 1B:
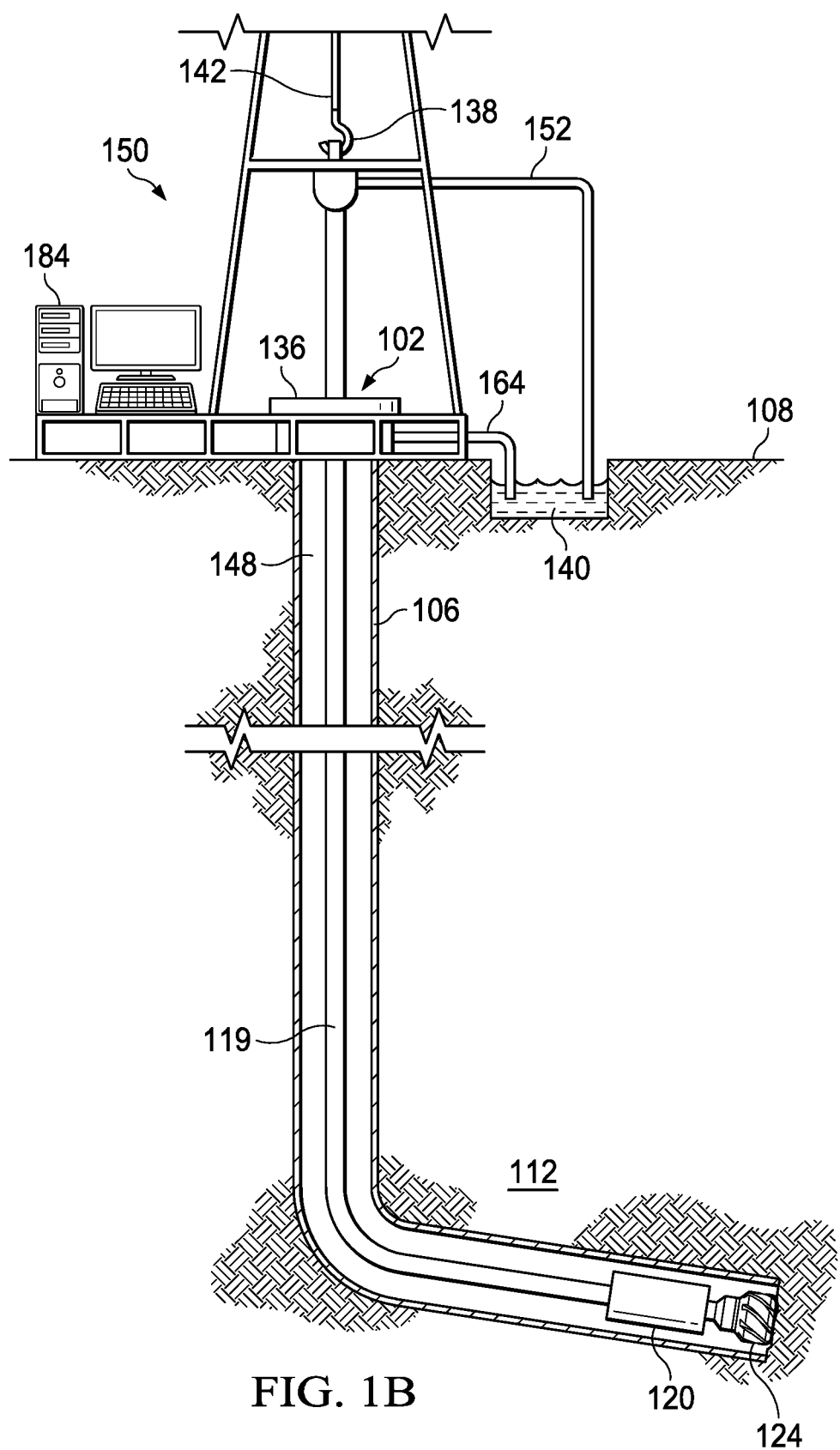
FIG. 1B is a schematic, side view of a logging while drilling (LWD)/measurement while drilling (MWD) environment where measurements of the formation resistivity are obtained during MWD/LWD operations, and are displayed on a display.

FIG. 1B is a schematic, side view of a LWD/MWD environment 150 with another tool 121 deployed to measure the properties of the formation 112 during a drilling operation. FIG. 1B may also represent another completion or preparation environment where a drilling operation is performed. A hook 138, cable 142, traveling block (not shown), and hoist (not shown) are provided to lower a drill sting 119 down borehole 106 of well 102 or to lift drill string 119 up from borehole 106 of well 102.

At the wellhead 136, an inlet conduit 152 is coupled to a fluid source (not shown) to provide fluids, such as drilling fluids, downhole. Drill string 119 has an internal cavity that provides a fluid flow path from surface 108 down to tool 121. In some embodiments, the fluids travel down drill string 119, through tool 121, and exit drill string 119 at a drill bit 124. The fluids flow back towards surface 108 through a wellbore annulus 148 and exit the wellbore annulus 148 via an outlet conduit 164 where the fluids are captured in container 140. In LWD systems, sensors or transducers (not shown) are typically located at the lower end of drill string 119. In one or more embodiments, sensors employed in LWD applications are built into a cylindrical drill collar that is positioned close to drill bit 124. While drilling is in progress, these sensors continuously or intermittently determine the formation resistivity of the downhole formation proximate to drill bit 124, and transmit the information to a surface detector by one or more telemetry techniques, including, but not limited to mud pulse telemetry, acoustic telemetry, and electromagnetic wave telemetry. In one or more embodiments, where a mud pulse telemetry system is deployed in borehole 106 to provide telemetry, telemetry information is transmitted by adjusting the timing or frequency of viable pressure pulses in the drilling fluid that is circulated through drill string 119 during drilling operations. In one or more embodiments, an acoustic telemetry system that transmits data via vibrations in the tubing wall of drill string 119 is deployed in borehole 106 to provide telemetry. More particularly, the vibrations are generated by an acoustic transmitter (not shown) mounted on drill string 119 and propagate along drill string 119 to an acoustic receiver (not shown) also mounted on drill string 119. In one or more embodiments, an electromagnetic wave telemetry system that transmits data using current flows induced in drill string 119 is deployed in borehole 106 to provide telemetry. Additional types of telemetry systems may also be deployed in borehole 106 to transmit data from tool 121 and other downhole components to controller 184.

Tool 121, similar to tool 120 shown in FIG. 1A, is also operable to obtain measurements of the resistivity of the formation 112 and provide data indicative of the formation resistivity to controller 184. Additional descriptions of the operations performed by tools 120 and 121 are provided in the paragraphs below. In some embodiments, controller 184, in response to receipt of data indicative of measurements of the resistivity of formation 112, performs the operations described herein to generate a volumetric rendering of the formation resistivity of formation 112, and display the volumetric rendering on controller 184. An operator may designate display parameters, such as formation resistivity threshold, formation resistivity range, threshold distance from the borehole, distance to a boundary to view and analyze portions of the volumetric rendering that satisfies the display parameters. In some embodiments, the operator, after analyzing the volumetric rendering, may steer drill bit 124 in a different direction to avoid certain boundaries (such as boundary of a water reservoir) not initially known to the operator or initially miscalculated.

Figure 2:
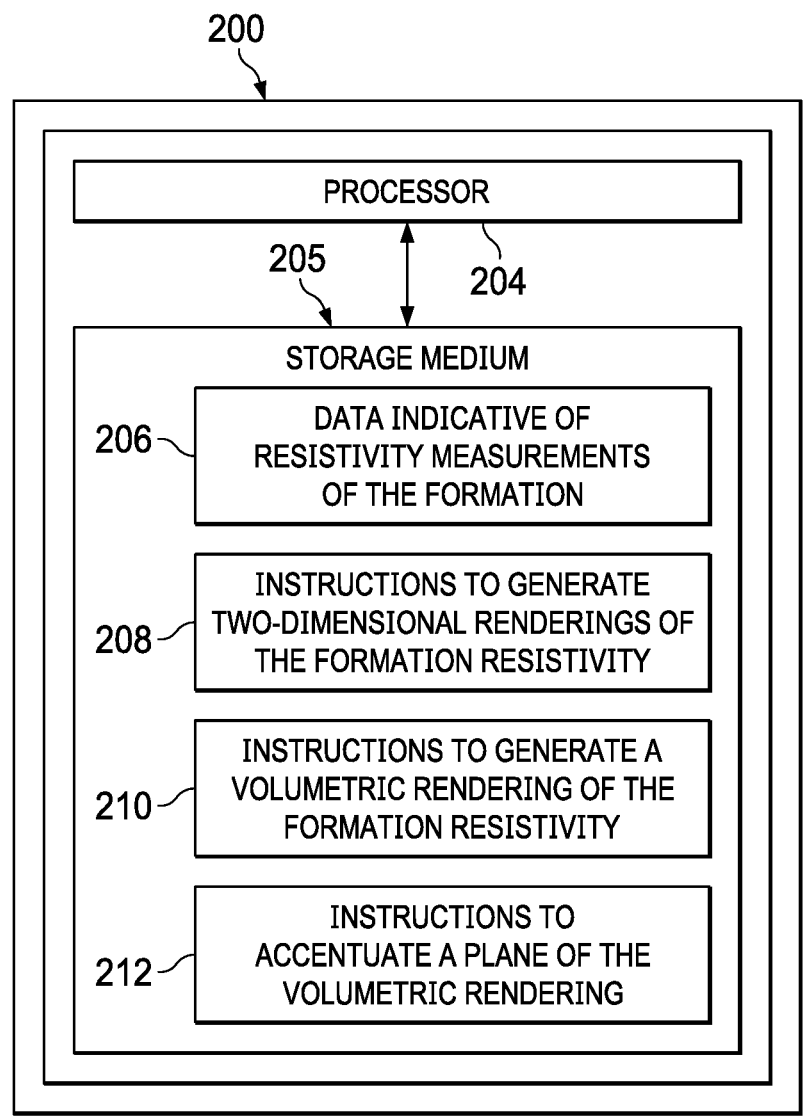
FIG. 2 is a block diagram of a formation resistivity evaluation system deployable in the wireline environment of FIG. 1A and in the LWD/MWD environment of FIG. 1B.

FIG. 2 is a block diagram of a formation resistivity evaluation system 200 that is deployable in the logging environment of FIG. 1A and in the LWD/MWD environment of FIG. 1B. The formation resistivity evaluation system 200 includes a storage medium 205 and a processor 204. The storage medium 205 may be formed from data storage components such as, but not limited to, read-only memory (ROM), random access memory (RAM), flash memory, magnetic hard drives, solid state hard drives, CD-ROM drives, DVD drives, floppy disk drives, as well as other types of data storage components and devices. In some embodiments, the storage medium 205 includes multiple data storage devices. In further embodiments, the multiple data storage devices may be physically stored at different locations. Data indicative of measurements obtained from tool 120, are transmitted to the formation resistivity evaluation system 200 and are stored at a first location 206 of the storage medium. As shown in FIG. 2, instructions to generate two-dimensional renderings of the formation resistivity are stored at a second location 208 of the storage medium 205, instructions to generate a volumetric rendering of the formation resistivity are stored at a third location 210 of the storage medium 205, and instructions to accentuate a plane of the volumetric rendering are stored at a fourth location 212 of the storage medium 205. The instructions to perform other operations described herein are also stored in the storage medium 205.

In some embodiments, formation resistivity evaluation system 200 is a component of controller 184 of FIGS. 1A and 1B, or a component of another surface-based electronic device. In other embodiments, formation resistivity evaluation system 200 is formed from controller 184 of FIGS. 1A and 1B, or from other surface-based electronic devices. In further embodiments, formation resistivity evaluation system 200 is a component of tool 120, tool 121, or a component of another downhole tool that is deployed in wellbore 106 of FIGS. 1A and 1B. In further embodiments, parts of formation resistivity evaluation system 200 is deployed on a surface based electronic device, such as controller 184 of FIGS. 1A and 1B, and parts of formation resistivity evaluation system 200 is deployed downhole.

In some embodiments, formation resistivity evaluation system 200 contains additional components used to evaluate formation properties of the downhole formation. For example, in some embodiments, formation resistivity evaluation system 200 also includes tools 120 and 121 of FIGS. 1A and 1B as well as other downhole sensors used to obtain data indicative of the formation resistivity of formation 112. In other embodiments, formation resistivity evaluation system 200 also includes telemetry systems described in FIGS. 1A and 1B, or other telemetry systems operable to transmit data between tools 120 and 121 of FIGS. 1A and 1B and controller 184. In one or more of such embodiments, formation resistivity evaluation system 200 also includes transmitters, receivers, transceivers, as well as other components used to transmit data between tools 120 and 121 and controller 184. In some embodiments, memory 205 also contain instructions to evaluate other types of formation properties, such as, but not limited to, formation porosity, formation density, and electrometric radiations emitted from formation 112. In such embodiments, processor 204 is operable to perform operations described herein to generate volumetric renderings of different types of formation properties of formation 112 and provide the generated volumetric renderings for display on controller 184. Addition description of operations performed by processor 204 to generate volumetric renderings of different types of formation properties are provided in the paragraphs below.

Figure 3A:
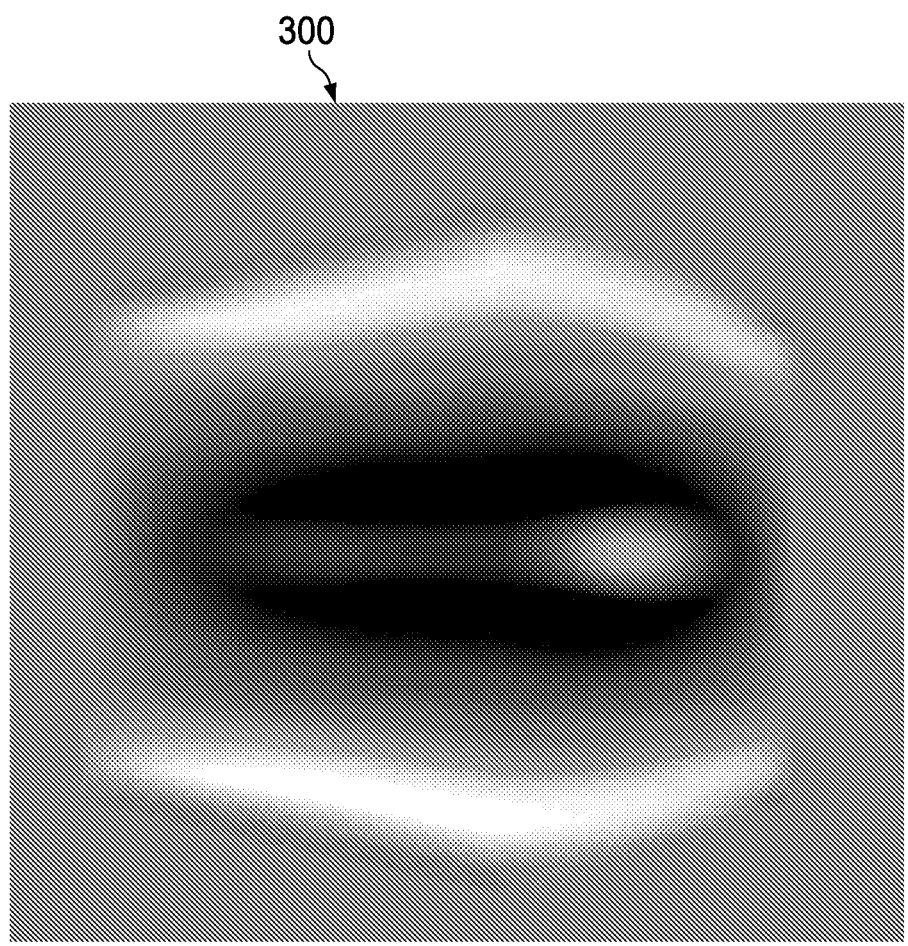
FIG. 3A is a perspective view of an exemplary volumetric rendering of the formation resistivity of the downhole formation.

FIG. 3A is a perspective view of an exemplary volumetric rendering 300 of the formation resistivity of formation 112. In the illustrated embodiment, volumetric rendering 300 contains a range of colors that illustrate a range of measurements of the resistivity of formation 112. In some embodiments, the scale and the value ranges (of potentially each color) are customizable by the operator. For example, a typical color scale is blue to red at resistivity values 0.2 to 2000 in logarithmic interpolation. In other embodiments, the range of colors illustrate change in the formation resistivity over a threshold distance. In further embodiments, the range of colors illustrate a distance to a boundary. In further embodiments, the range of colors represents one or more forms of electromagnetic radiation. In one or more of such embodiments, the range of colors represents a range of gamma radiations emitted by the formation, or a change in the gamma radiations of the formation. In one or more of such embodiments, the range of colors represents a range of x-radiations emitted by the formation, or a change in the x-radiations of the formation. In further embodiments, the range of colors represents the density of the formation. In further embodiments, the range of colors represents the porosity of the formation. In further embodiments, the range of colors represents seismic waves emitted by the formation.

Figure 3B:
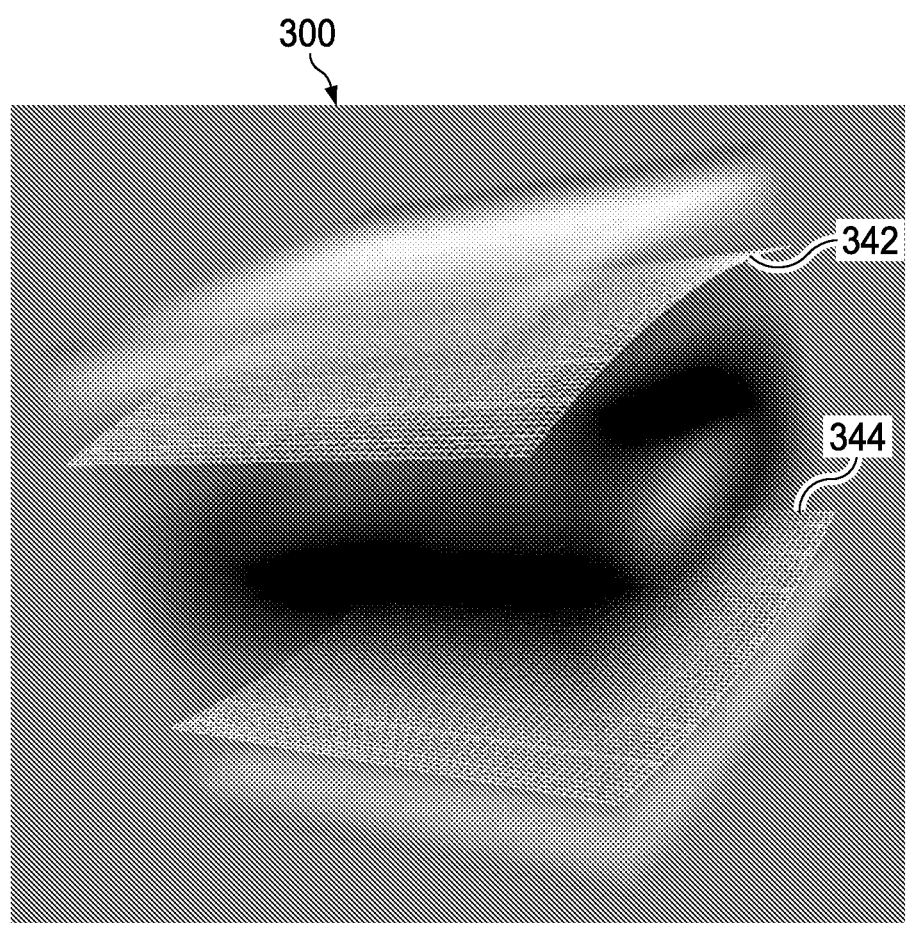
FIG. 3B is another perspective view of the exemplary volumetric rendering of FIG. 3A, where the volumetric rendering is rotated to display the formation resistivity from a different angle.

FIG. 3B is another perspective view of the exemplary volumetric rendering of FIG. 3A, where the volumetric rendering is rotated to display the formation resistivity from a different angle. As described herein, the operator may rotate the volumetric rendering to display the formation resistivity of formation 112 from different angles. Further, two-dimensional plane 342 and two-dimensional plane 344 are accentuated based on a display parameter entered by the user. In the illustrated embodiment, two-dimensional plane 342 and two-dimensional plane 344 represent the boundary planes of multiple two-dimensional planes that satisfy the display parameter.

Figure 3C:
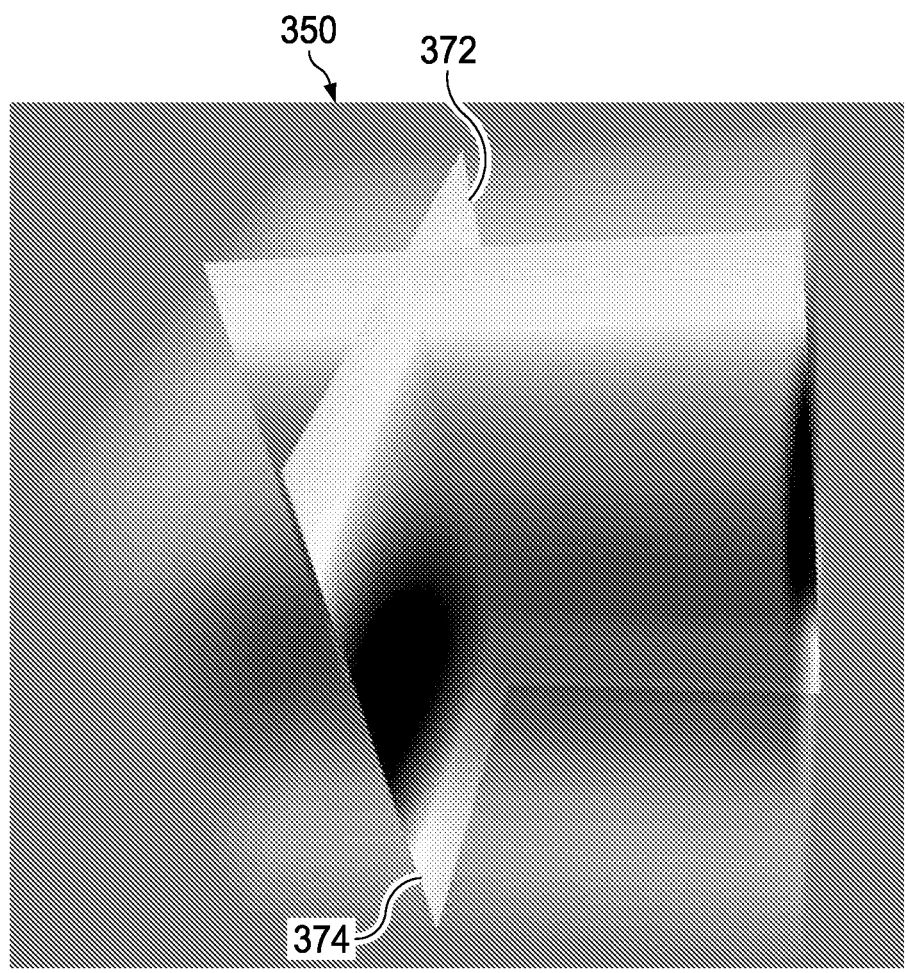
FIG. 3C is a perspective view of another exemplary volumetric rendering of the formation resistivity of the downhole formation.

FIG. 3C is a perspective view of another exemplary volumetric rendering 350 of formation 112 resistivity of formation 112. In the depicted embodiment, two-dimensional plane 372 and two-dimensional plane 374 are accentuated based on another display parameter entered by the user. In the illustrated embodiment, two-dimensional plane 372 and two-dimensional plane 374 bisect each other. Further, other two-dimensional planes that do not satisfy the display parameter are removed from being displayed or are displayed in transparent or translucent color schemes to accentuate two-dimensional planes 372 and 374. In the depicted embodiment, two-dimensional plane 372 represents the resistivity values at a depth range along the vertical section of the well path and contains information about the formation resistivity above and below the well path. Further, two-dimensional plane 374 represents the resistivity values at a similar depth range along a perpendicular section of the well path and contains information about the formation resistivity around a single point on the well path.

In some embodiments, processor is operable to zoom in to focus on certain features of the generated volumetric rendering. For example, processor is operable to zoom in to focus on two-dimensional plane 372 of FIG. 3C or certain points of two-dimensional plane 372 of FIG. 3C. The processor is further operable to zoom out from a zoom in view to display additional portions of the volumetric rendering. In certain embodiments, the opacity of certain portions of a volumetric rendering changes as the volumetric rendering is zoomed in or zoomed out. For example, the opacity of two-dimensional planes or points on two-dimensional planes that do not satisfy display parameters become more and more opaque as the volumetric rendering is zoomed in. As such, two-dimensional planes or points that satisfy the display parameters are accentuated as the volumetric rendering is zoomed in.

In some embodiments, the processor, in addition to performing zoom in/zoom out operations, is also operable to perform a variety of other operations to modify the display of a volumetric rendering, such as, but not limited to rotating the volumetric rendering, tilting the volumetric rendering, re-orientating the volumetric rendering, as well as performing other suitable operations to modify the display of the volumetric rendering.

Figure 4:
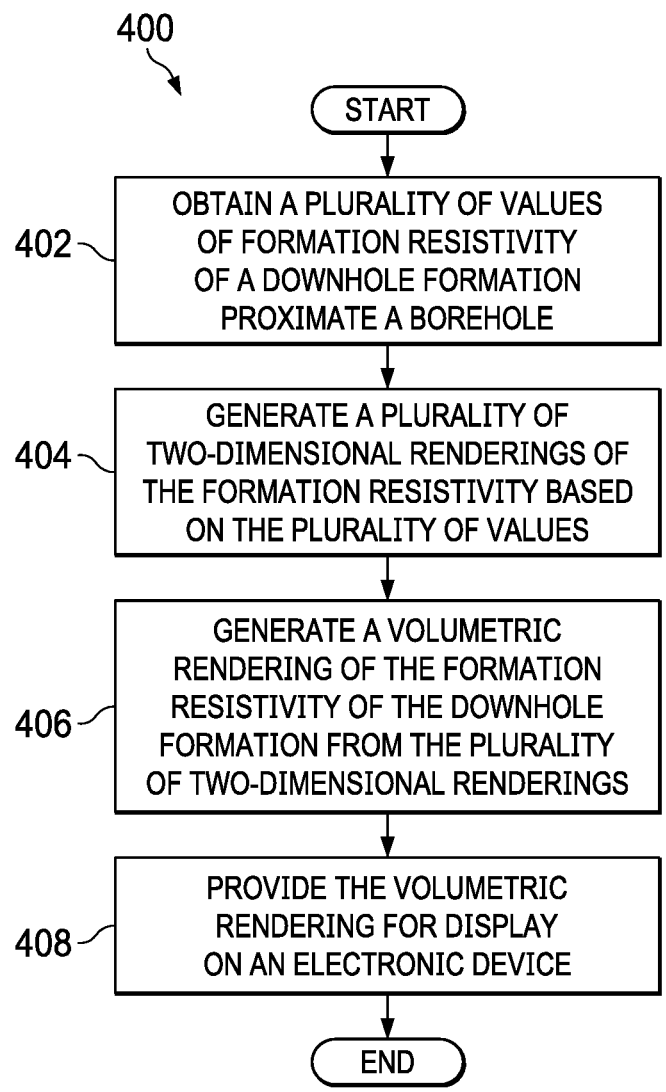
FIG. 4 is a flow chart of a process to evaluate formation resistivity.

FIG. 4 is a flow chart of a process 400 to evaluate formation resistivity. Although the operations in the process 400 are shown in a particular sequence, certain operations may be performed in different sequences or at the same time where feasible.

As described below, process 400 provides an intuitive way for evaluating formation properties of a downhole formation proximate a borehole, such as formation 112 of FIGS. 1A and 1B. The process provides an operator with volumetric renderings of the downhole formation that the operator may analyze to determine formation properties of the formation, thereby allowing the operator to make informed decisions during different stages of hydrocarbon production. In certain operations, such as preparation and drilling operators, where data used to generate the volumetric renderings are provided in real-time or close to real-time, the process allows the operator to quickly analyze the formation properties of the downhole formation and to make real-time decisions, such as how and where to steer a drill bit to avoid certain boundaries. The foregoing allows the operator to make informed real-time adjustments to correct human and machine errors, thereby reducing the financial costs as well as safety hazards attributed to such errors.

The process also allows the operator to accentuate certain portions of volumetric renderings that contain values of interest and allows the user to reduce the visibility or hide other portions of volumetric renderings that do not contain values of interest, thereby allowing the operator to quickly identify areas of interest, thereby reducing the cognitive burden of the operator when the operator is analyzing formation properties, and creating a more efficient human-machine interface. The process also allows the operator to compare different types of formation properties (such as, but not limited to formation resistivity, formation density, formation porosity, and amount and types of electromagnetic radiation emitted from the formation) and to analyze the different types of formation properties. The foregoing improves the accuracy of decisions made by the operator, thereby reducing financial costs as well as safety hazards attributed to incorrect decisions.

A processor of a formation resistivity evaluation system, such as the formation resistivity evaluation system 200, receives, at block S402, values of formation resistivity of a downhole formation proximate a borehole, such as formation 112 of FIGS. 1A and 1B. In the depicted embodiments of FIGS. 1A and 1B, measurements of the formation resistivity of formation 112 are made by tool 120 and are stored on storage medium 205 of FIG. 2. At block S404, the processor generates two-dimensional renderings of the formation resistivity based on the plurality of values. As described herein, each two-dimensional rendering of the plurality of two-dimensional renderings illustrates an inversion of the formation resistivity along a plane of the downhole formation.

At block S406, the processor generates a volumetric rendering of the formation resistivity of the downhole formation from the plurality of two-dimensional renderings, wherein the volumetric rendering comprises a plurality of two-dimensional planes. At block S408, the processor provides the volumetric rendering for display on a display of an electronic device, such as controller 184. The generated volumetric rendering is analyzed on controller 184 to determine one or more formation properties of formation 112. The volumetric rendering is displayed in a range of colors to help the operator identify different features of formation 112. In some embodiments, the range of colors represents a range of values of resistivity measurements of formation 112. In other embodiments, the range of colors represents a range of electromagnetic radiations of formation 112. In further embodiments, the range of colors represents the density of formation 112. In further embodiments, the range of colors represents the porosity of formation 112. In further embodiments, the range of colors represents distance to a boundary, or another feature of formation 112 described herein.

In some embodiments, the user may rotate the displayed volumetric rendering to view different angles of the volumetric rendering. In some embodiments, the operator may designate to view specific portions of the volumetric rendering. More particularly, the operator may specify one or more display parameters for customizing the volumetric rendering. The processor, in response to receiving the display parameters, determines one or more two-dimensional planes of the volumetric rendering that satisfies the display parameters. In some or more embodiments, the two-dimensional planes that satisfy the display parameters are parallel planes. In the embodiment of FIG. 3B, two-dimensional planes 342 and 344 are parallel planes. In other embodiments, some of the two-dimensional planes that satisfy the display parameters bisect other two-dimensional planes that also satisfy the display parameters. In the embodiment of FIG. 3C, two-dimensional planes 372 and 374 bisect each other. In further embodiments, the two-dimensional plane satisfies the display parameters if an inversion of the formation resistivity illustrated by the two-dimensional plane satisfies the display parameters.

The processor also accentuates the two-dimensional planes that satisfy the display parameters. In the embodiment illustrated in FIG. 3C, the processor accentuates two-dimensional planes 372 and 374 by removing some of the planes that do not satisfy the display parameter from being displayed on the electronic device and displaying other planes that do not satisfy the display parameter in translucent color schemes. In other embodiments, the processor accentuates certain planes or certain points that satisfy the display parameters by rendering other planes or other points that do not satisfy the display parameters opaquer relative to the planes or points that satisfy the display parameters. In other embodiments, the processor accentuates the two-dimensional planes that satisfy the display parameters by highlighting the two-dimensional planes.

In some embodiments, where multiple two-dimensional planes that satisfy the display parameters are adjacent to each other, the processor accentuates each of the adjacent two-dimensional planes. In some embodiments, the processor may accentuate two-dimensional planes that are not illustrated by any individual two-dimensional rendering. For example, where the two-dimensional renderings of formation 112 are renderings along planes defined by an x-axis and a y-axis of formation 112, the accentuated two-dimensional plane may be a plane defined by the y-axis and a z-axis of formation 112 or a plane defined by the x-axis and the z-axis of formation 112. In other embodiments, the two-dimensional plane is not defined by any two axes of formation 112. For example, the two-dimensional plane is a plane that is defined by the surface area of a well path. As such, the processor is operable to cause electronic device to display not only the two-dimensional renderings that were initially generated from the values of formation resistivity, but also other two-dimensional renderings of the volumetric rendering along planes formed from different axes.

In some embodiments, the processor performs the foregoing operations to generate multiple volumetric renderings of different formation properties of formation 112 and accentuates different planes or different points of each generated volumetric rendering that satisfies display parameters. For example, the processor, in addition to generating the volumetric rendering of the formation resistivity of formation 112, also generates a volumetric rendering of gamma radiations emitted by formation 112. In other embodiments, the processor generates additional volumetric renderings of other formation properties of formation 112, such as x-radiations emitted by formation 112, other types of electromagnetic radiations emitted by formation 112, the density of formation 112, the porosity of formation 112, as well as other formation properties of formation 112. In one or more of such embodiments, multiple volumetric renderings of different formation properties of formation 112 are simultaneously displayed on one or more displays to allow the operator to simultaneously analyze different formation properties of formation 112. In one or more embodiments, the operator may also specify different display parameters for each of the generated volumetric rendering.

The above-disclosed embodiments have been presented for purposes of illustration and to enable one of ordinary skill in the art to practice the disclosure, but the disclosure is not intended to be exhaustive or limited to the forms disclosed. Many insubstantial modifications and variations will be apparent to those of ordinary skill in the art without departing from the scope and spirit of the disclosure. For instance, although the flowcharts depict a serial process, some of the steps/processes may be performed in parallel or out of sequence, or combined into a single step/process. The scope of the claims is intended to broadly cover the disclosed embodiments and any such modification. Further, the following clauses represent additional embodiments of the disclosure and should be considered within the scope of the disclosure.

Clause 1, a method to evaluate formation resistivity, the method comprising: obtaining, from a downhole tool deployed in a borehole, a plurality of values of formation resistivity of a downhole formation proximate the borehole; generating a plurality of two-dimensional renderings of the formation resistivity based on the plurality of values, wherein each two-dimensional rendering of the plurality of two-dimensional renderings illustrates an inversion of the formation resistivity along a plane of the downhole formation; generating a volumetric rendering of the formation resistivity of the downhole formation from the plurality of two-dimensional renderings, wherein the volumetric rendering comprises a plurality of two-dimensional planes, and wherein each two-dimensional plane of the plurality of two-dimensional planes illustrates an inversion of formation resistivity along the respective two-dimensional plane; and providing the volumetric rendering on for display on a display of an electronic device, wherein the generated volumetric rendering is analyzed on the electronic device to determine one or more formation properties of the formation.

Clause 2, the method of clause 1, further comprising: receiving a first display parameter of a set of display parameters for customizing the volumetric rendering; in response to receiving the first display parameter, determining a first two-dimensional plane of the plurality of two-dimensional planes that satisfies the first display parameter; and accentuating the first two-dimensional plane on the electronic device.

Clause 3, the method of clause 1 or 2, wherein the first two-dimensional plane satisfies the first display parameter if an inversion of the formation resistivity illustrated by the first two-dimensional plane satisfies the first display parameter.

Clause 4, the method of any of clauses 1-3, further comprising in response to receiving the first display parameter: determining one or more two-dimensional planes of the plurality of two-dimensional planes that do not satisfy the first display parameter; and removing the one or more two-dimensional planes from being displayed on the electronic device.

Clause 5, the method of any of clauses 1-4, further comprising accentuating a second two-dimensional plane of the plurality of two-dimensional planes, wherein the second two-dimensional plane also satisfies the first display parameter.

Clause 6, the method of any of clauses 1-5, wherein the first two-dimensional plane and the second two-dimensional plane are both formed from a first axis and a second axis of the volumetric rendering.

Clause 7, the method of any of clauses 1-5, wherein the first two-dimensional plane bisects the second two-dimensional plane.

Clause 8, the method of any of clauses 1-7, wherein the set of display parameters comprises a formation resistivity threshold, a formation resistivity range, a threshold distance from the borehole, a range of colors illustrating the volumetric rendering, and a threshold variation in formation resistivity within a threshold distance.

Clause 9, the method of any of clauses 1-8, wherein the first two-dimensional plane and the plurality of two-dimensional renderings are not formed by identical axis.

Clause 10, the method of any of clauses 1-9, further comprising: receiving a second display parameter of a set of display parameters for customizing the volumetric rendering; in response to receiving the second display parameter, determining a first set of adjacent two-dimensional planes of the plurality of two-dimensional planes, wherein each two-dimensional plane of the first set of adjacent two-dimensional planes satisfies the second display parameter; and accentuating the first set of adjacent two-dimensional planes on the electronic device.

Clause 11, the method of any of clauses 1-10, further comprising: receiving a third display parameter of a set of display parameters for customizing the volumetric rendering; in response to receiving the third display parameter, determining a second set of adjacent two-dimensional planes of the plurality of two-dimensional planes, wherein none of the second set of adjacent two-dimensional planes satisfies the third display parameter; and removing the second set of adjacent two-dimensional planes from being displayed on the electronic device.

Clause 12, the method of any of clauses 1-11, wherein the plurality of values of resistivity of the formation comprise a plurality of true vertical depth resistivity of the formation, and wherein the volumetric rendering is a rendering of an inversion of the vertical depth resistivity of the formation.

Clause 13, the method of any of clauses 1-12, wherein displaying the volumetric rendering comprises displaying the volumetric rendering in a plurality of colors, and wherein the plurality of colors represents a range of values of resistivity measurements of the formation resistivity.

Clause 14, the method of any of clauses 1-13, further comprising: receiving a fourth set of display parameters for customizing the volumetric rendering to display resistivity measurements represented by a first set of colors of the plurality of colors; in response to receiving the fourth set of display parameters, determining a third set of two-dimensional planes that do not include the first set of colors; and removing the third set of two-dimensional planes from being displayed on the electronic device.

Clause 15, A formation resistivity evaluation system, comprising: memory storing a plurality of values of formation resistivity of a downhole formation proximate a borehole; and a processor operable to: generate a plurality of two-dimensional renderings of the formation resistivity based on the plurality of values, wherein each two-dimensional rendering of the plurality of two-dimensional renderings illustrates an inversion of the formation resistivity along a plane of the downhole formation; generate a volumetric rendering of the formation resistivity of the downhole formation from the plurality of two-dimensional renderings, wherein the volumetric rendering comprises a plurality of two-dimensional planes, and wherein each two-dimensional plane of the plurality of two-dimensional planes illustrates an inversion of formation resistivity along the respective two-dimensional plane; and providing the volumetric rendering for display on a display of an electronic device, wherein the generated volumetric rendering is analyzed on the electronic device to determine one or more formation properties of the formation.

Clause 16, the formation resistivity evaluation system of clause 15, wherein the processor is further operable to: receive a first display parameter of a set of display parameters for customizing the volumetric rendering; in response to receiving the first display parameter, determine a first two-dimensional plane of the plurality of two-dimensional planes that satisfies the first display parameter; and accentuate the first two-dimensional plane on the electronic device.

Clause 17, the formation resistivity evaluation system of clause 15 or 16, wherein the first two-dimensional plane satisfies the first display parameter if an inversion of the formation resistivity illustrated by the first two-dimensional plane satisfies the first display parameter.

Clause 18, the formation resistivity evaluation system of any of clauses 15-17, wherein in response to receiving the first display parameter, the processor is further operable to: determine one or more two-dimensional planes of the plurality of two-dimensional planes that do not satisfy the first display parameter; and remove the one or more two-dimensional planes from being displayed on the electronic device.

Clause 19. the formation resistivity evaluation system of any of clauses 15-18, wherein the set of display parameters comprises a formation resistivity threshold, a formation resistivity range, a threshold distance from the borehole, a range of colors illustrating the volumetric rendering, and a threshold variation in formation resistivity within a threshold distance.

Clause 20, a machine-readable medium comprising instructions stored therein, which when executed by one or more processors, causes the one or more processors to perform operations comprising: generating a plurality of two-dimensional renderings of formation resistivity of a downhole formation proximate a borehole based on a plurality of values of formation resistivity, wherein each two-dimensional rendering of the plurality of two-dimensional renderings illustrates an inversion of the formation resistivity along a plane of the downhole formation; generating a volumetric rendering of the formation resistivity of the downhole formation from the plurality of two-dimensional renderings, wherein the volumetric rendering comprises a plurality of two-dimensional planes, and wherein each two-dimensional plane of the plurality of two-dimensional planes illustrates an inversion of formation resistivity along the respective two-dimensional plane; displaying the volumetric rendering on an electronic device; receiving a first display parameter of a set of display parameters for customizing the volumetric rendering; in response to receiving the first display parameter, determining a first two-dimensional plane of the plurality of two-dimensional planes that satisfies the first display parameter; and accentuating the first two-dimensional plane on the electronic device.

Although certain embodiments disclosed herein describes transmitting electrical currents from electrodes deployed on an inner string to electrodes deployed on an outer string, one of ordinary skill would understand that the subject technology disclosed herein may also be implemented to transmit electrical currents from electrodes deployed on the outer string to electrodes deployed on the inner string.

As used herein, the singular forms "a", "an" and "the" are intended to include the plural forms as well, unless the context clearly indicates otherwise. It will be further understood that the terms "comprise" and/or "comprising," when used in this specification and/or the claims, specify the presence of stated features, steps, operations, elements, and/or components, but do not preclude the presence or addition of one or more other features, steps, operations, elements, components, and/or groups thereof. In addition, the steps and components described in the above embodiments and figures are merely illustrative and do not imply that any particular step or component is a requirement of a claimed embodiment.

What is claimed is:

1. A method to evaluate formation resistivity comprising:
   obtaining, from a downhole tool deployed in a borehole, a plurality of values of formation resistivity of a downhole formation proximate the borehole;
   generating a plurality of two-dimensional renderings of the formation resistivity based on the plurality of values, wherein each two-dimensional rendering of the plurality of two-dimensional renderings illustrates an inversion of the formation resistivity along a plane of the downhole formation;
   generating a volumetric rendering of the formation resistivity of the downhole formation from the plurality of two-dimensional renderings overlaid adjacent to each other, wherein the volumetric rendering comprises a plurality of two-dimensional planes, and wherein each two-dimensional plane of the plurality of two-dimensional planes illustrates an inversion of formation resistivity along the respective two-dimensional plane; and
   providing the volumetric rendering for display on an electronic device, wherein the generated volumetric rendering is analyzed on the electronic device to determine one or more formation properties of the formation.

2. The method of claim 1, further comprising:
   receiving a first display parameter of a set of display parameters for customizing the volumetric rendering;
   in response to receiving the first display parameter, determining a first two-dimensional plane of the plurality of two-dimensional planes that satisfies the first display parameter; and accentuating the first two-dimensional plane on the electronic device.

3. The method of claim 2, wherein the first two-dimensional plane satisfies the first display parameter if an inversion of the formation resistivity illustrated by the first two-dimensional plane satisfies the first display parameter.

4. The method of claim 2, further comprising in response to receiving the first display parameter:
determining one or more two-dimensional planes of the plurality of two-dimensional planes that do not satisfy the first display parameter; and
removing the one or more two-dimensional planes from being displayed on the electronic device.

5. The method of claim 2, further comprising accentuating a second two-dimensional plane of the plurality of two-dimensional planes, wherein the second two-dimensional plane also satisfies the first display parameter.

6. The method of claim 5, wherein the first two-dimensional plane and the second two-dimensional plane are both formed from a first axis and a second axis of the volumetric rendering.

7. The method of claim 5, wherein the first two-dimensional plane bisects the second two-dimensional plane.

8. The method of claim 2, wherein the set of display parameters comprises a formation resistivity threshold, a formation resistivity range, a threshold distance from the borehole, a range of colors illustrating the volumetric rendering, and a threshold variation in formation resistivity within a threshold distance.

9. The method of claim 2, wherein the first two-dimensional plane and the plurality of two-dimensional renderings are not formed by identical axis.

10. The method of claim 1, further comprising:
receiving a second display parameter of a set of display parameters for customizing the volumetric rendering;
in response to receiving the second display parameter, determining a first set of adjacent two-dimensional planes of the plurality of two-dimensional planes, wherein each two-dimensional plane of the first set of adjacent two-dimensional planes satisfies the second display parameter; and
accentuating the first set of adjacent two-dimensional planes on the electronic device.

11. The method of claim 1, further comprising:
receiving a third display parameter of a set of display parameters for customizing the volumetric rendering;
in response to receiving the third display parameter, determining a second set of adjacent two-dimensional planes of the plurality of two-dimensional planes, wherein none of the second set of adjacent two-dimensional planes satisfies the third display parameter; and
removing the second set of adjacent two-dimensional planes from being displayed on the electronic device.

12. The method of claim 1, wherein the plurality of values of resistivity of the formation comprise a plurality of true vertical depth resistivity of the formation, and wherein the volumetric rendering is a rendering of an inversion of the vertical depth resistivity of the formation.

13. The method of claim 1, wherein displaying the volumetric rendering comprises displaying the volumetric rendering in a plurality of colors, and wherein the plurality of colors represents a range of values of resistivity measurements of the formation resistivity.

14. The method of claim 13, further comprising:
receiving a fourth set of display parameters for customizing the volumetric rendering to display resistivity measurements represented by a first set of colors of the plurality of colors;
in response to receiving the fourth set of display parameters, determining a third set of two-dimensional planes that do not include the first set of colors; and
removing the third set of two-dimensional planes from being displayed on the electronic device.

15. A formation resistivity evaluation system, comprising:
memory storing a plurality of values of formation resistivity of a downhole formation proximate a borehole; and
a processor operable to:
generate a plurality of two-dimensional renderings of the formation resistivity based on the plurality of values, wherein each two-dimensional rendering of the plurality of two-dimensional renderings illustrates an inversion of the formation resistivity along a plane of the downhole formation;
generate a volumetric rendering of the formation resistivity of the downhole formation from the plurality of two-dimensional renderings overlaid adjacent to each other, wherein the volumetric rendering comprises a plurality of two-dimensional planes, and wherein each two-dimensional plane of the plurality of two-dimensional planes illustrates an inversion of formation resistivity along the respective two-dimensional plane; and
provide the generated volumetric rendering for display on an electronic device, wherein the generated volumetric rendering is analyzed on the electronic device to determine one or more formation properties of the formation.

16. The formation resistivity evaluation system of claim 15, wherein the processor is further operable to:
receive a first display parameter of a set of display parameters for customizing the volumetric rendering;
in response to receiving the first display parameter, determine a first two-dimensional plane of the plurality of two-dimensional planes that satisfies the first display parameter; and
accentuate the first two-dimensional plane on the electronic device.

17. The formation resistivity evaluation system of claim 16, wherein the first two-dimensional plane satisfies the first display parameter if an inversion of the formation resistivity illustrated by the first two-dimensional plane satisfies the first display parameter.

18. The formation resistivity evaluation system of claim 16, wherein in response to receiving the first display parameter, the processor is further operable to:
determine one or more two-dimensional planes of the plurality of two-dimensional planes that do not satisfy the first display parameter; and
remove the one or more two-dimensional planes from being displayed on the electronic device.

19. The formation resistivity evaluation system of claim 16, wherein the set of display parameters comprises a formation resistivity threshold, a formation resistivity range, a threshold distance from the borehole, a range of colors illustrating the volumetric rendering, and a threshold variation in formation resistivity within a threshold distance.

20. A machine-readable medium comprising instructions stored therein, which when executed by one or more processors, causes the one or more processors to perform operations comprising:

obtaining, from a downhole tool deployed in a borehole, a plurality of values of formation resistivity of a downhole formation proximate the borehole;

generating a plurality of two-dimensional renderings of formation resistivity of the downhole formation based on a plurality of values of formation resistivity, wherein each two-dimensional rendering of the plurality of two-dimensional renderings illustrates an inversion of the formation resistivity along a plane of the downhole formation;

generating a volumetric rendering of the formation resistivity of the downhole formation from the plurality of two-dimensional renderings overlaid adjacent to each other, wherein the volumetric rendering comprises a plurality of two-dimensional planes, and wherein each two-dimensional plane of the plurality of two-dimensional planes illustrates an inversion of formation resistivity along the respective two-dimensional plane;

providing the volumetric rendering on a display of an electronic device;

receiving a first display parameter of a set of display parameters for customizing the volumetric rendering;

in response to receiving the first display parameter, determining a first two-dimensional plane of the plurality of two-dimensional planes that satisfies the first display parameter; and accentuating the first two-dimensional plane on the electronic device.

\* \* \* \* \*